(12) United States Patent
Menke

(10) Patent No.: US 8,863,729 B2
(45) Date of Patent: Oct. 21, 2014

(54) MOTOR VEHICLE

(75) Inventor: Andreas Menke, Tiefenbronn-Lehningen (DE)

(73) Assignee: Dr. Ing. H.C.F. Porsche Aktiengesellschaft, Stuttgart (DE)

(*) Notice: Subject to any disclaimer, the term of this patent is extended or adjusted under 35 U.S.C. 154(b) by 283 days.

(21) Appl. No.: 13/313,613

(22) Filed: Dec. 7, 2011

(65) Prior Publication Data

US 2012/0152209 A1    Jun. 21, 2012

(30) Foreign Application Priority Data

Dec. 21, 2010  (DE) .......................... 10 2010 061 429

(51) Int. Cl.
*F02M 25/08* (2006.01)
*B60K 15/035* (2006.01)
*B01D 53/04* (2006.01)

(52) U.S. Cl.
CPC ......... *F02M 25/089* (2013.01); *F02M 25/0818* (2013.01); *F02M 25/0872* (2013.01); *F02M 25/0836* (2013.01); *F02M 25/08* (2013.01); *B60K 15/03504* (2013.01); *B01D 53/04* (2013.01); *B01D 2257/702* (2013.01); *B01D 2259/40086* (2013.01); *B01D 2259/4516* (2013.01)
USPC .......................................... 123/518; 123/520

(58) Field of Classification Search
CPC ............. B60K 15/03504; F02M 25/08; F02M 25/089; F02M 25/0836; F02M 25/0872; F02M 25/0818
USPC .................................. 123/521, 516, 518–520
See application file for complete search history.

(56) References Cited

U.S. PATENT DOCUMENTS

| | | | |
|---|---|---|---|
| 5,220,898 A | 6/1993 | Kidokoro et al. | |
| RE34,518 E * | 1/1994 | Covert et al. | 137/588 |
| 5,426,941 A * | 6/1995 | Lewis | 60/693 |
| 6,435,164 B1 * | 8/2002 | Kaiser et al. | 123/516 |
| 6,557,534 B2 * | 5/2003 | Robichaux et al. | 123/520 |
| 6,950,742 B2 * | 9/2005 | Yamaguchi et al. | 701/114 |
| 7,647,920 B2 | 1/2010 | Amamo et al. | |
| 8,297,263 B2 * | 10/2012 | Pursifull | 123/518 |
| 8,447,495 B2 * | 5/2013 | Pearce et al. | 701/103 |
| 2002/0104516 A1 | 8/2002 | Kaiser et al. | |
| 2008/0179121 A1 * | 7/2008 | Sauvlet et al. | 180/65.2 |
| 2009/0133673 A1 * | 5/2009 | Amano et al. | 123/520 |
| 2011/0132331 A1 * | 6/2011 | Pursifull | 123/478 |

FOREIGN PATENT DOCUMENTS

DE   10 2007 022 188   11/2008

* cited by examiner

*Primary Examiner* — Thomas Moulis
(74) *Attorney, Agent, or Firm* — Gerald E. Hespos; Michael J. Porco; Matthew T. Hespos

(57) ABSTRACT

A motor vehicle has an internal combustion engine (1) that is supplied with fuel from a fuel tank (4). A regeneratable filter device (6) is associated with the fuel tank (4) and can be connected to a vacuum storage device (20) for purging the filter device (6). To simplify and/or improve the regeneration of the filter device, the vacuum storage device (20) is arranged outside an intake tract of the internal combustion engine (1) and is associated with the fuel tank (4).

9 Claims, 3 Drawing Sheets

MOTOR VEHICLE

CROSS-REFERENCE TO RELATED APPLICATION

This application claims priority under 35 USC 119 to German Patent Application No. 10 2010 061 429.7, filed on Dec. 21, 2010, the entire disclosure of which is incorporated herein by reference.

BACKGROUND OF THE INVENTION

1. Field of the Invention

The invention relates to a motor vehicle with an internal combustion engine supplied with fuel from a fuel tank. A regeneratable filter device is associated with the fuel tank and can be connected to a vacuum storage device for purging the filter device. The invention also relates to a method for operating a motor vehicle.

2. Description of the Related Art

German Laid-Open Application DE 10 2007 002 188 A1 discloses a hybrid vehicle with a tank venting system that has a filter device. The filter device can be purged with fresh air and regenerated. The known hybrid vehicle has an internal combustion engine with an intake tract. The intake tract includes a vacuum storage unit that allows purging of the filter device when the valve devices are open, even when the internal combustion engine is switched off.

It is the object of the invention to simplify and/or improve the regeneration of the filter device in a hybrid vehicle.

SUMMARY OF THE INVENTION

The invention relates to a motor vehicle with an internal combustion engine that is supplied with fuel from a fuel tank. The motor vehicle also has a regeneratable filter device associated with the fuel tank and connectable to a vacuum storage device for purging the filter device. The vacuum storage device is arranged outside an intake tract of the internal combustion engine, is associated with the fuel tank and preferably is in the vicinity of the fuel tank. The vacuum storage device may comprise at least one vacuum storage unit, arranged in the vicinity of the fuel tank, on the fuel tank or in the fuel tank. The vacuum storage device may also comprise a plurality of vacuum storage units. The vacuum in the vacuum storage unit can be generated in various ways. The vacuum storage device functions to draw ambient air through the filter device into the vacuum storage unit for purging.

The filter device preferably is between the vacuum storage device and a tank venting valve. Thus, a conventional tank venting valve can be used to particular advantage.

The vacuum storage device may be between the filter device and a tank venting valve. Thus, a conventional tank venting valve can be used to particular advantage for purging the vacuum storage device.

The vacuum storage device may be connected to a side of the filter device that is associated with the internal combustion engine. The other side of the filter device can be connected, either directly or via further devices, to the environment to pass ambient air through the filter device for purging.

The vacuum storage device can be connected to the internal combustion engine to purge the vacuum storage device. Ambient air is passed through the vacuum storage device, preferably via the filter device to purge the vacuum storage device. The ambient air passed through the vacuum storage device absorbs fuel vapors, in particular hydrocarbon vapors, collected in the vacuum storage device, which are then burned together with the ambient air in the internal combustion engine.

A vacuum pump may be connected to the vacuum storage device to generate a vacuum in the vacuum storage device. The vacuum pump can be driven electrically or by the internal combustion engine.

The vacuum storage device may be connected to the internal combustion engine to generate a vacuum. Thus, the running internal combustion engine can be used as a vacuum pump.

The motor vehicle preferably is a hybrid vehicle with an electrical machine. The hybrid vehicle preferably is a plug-in hybrid vehicle that can be charged at a socket outlet.

The above-described hybrid vehicle is operated in accordance with the method of the invention by connecting the vacuum storage device to the environment via the filter device to regenerate the filter device. The vacuum storage device preferably is used after a vehicle refueling operation to purge the filter device. Thus, the full or a relatively large working capacity of the filter device to be made available in a simple way after refueling, irrespective of whether the internal combustion engine is running or not.

A preferred embodiment of the method includes feeding fuel vapors collected in the vacuum storage device to the internal combustion engine and burning the collected fuel vapors in the internal combustion engine.

Further advantages, features and details of the invention will emerge from the following description, in which various embodiments are described in detail with reference to the drawings.

DETAILED DESCRIPTION OF THE PREFERRED EMBODIMENTS

Figure 1:
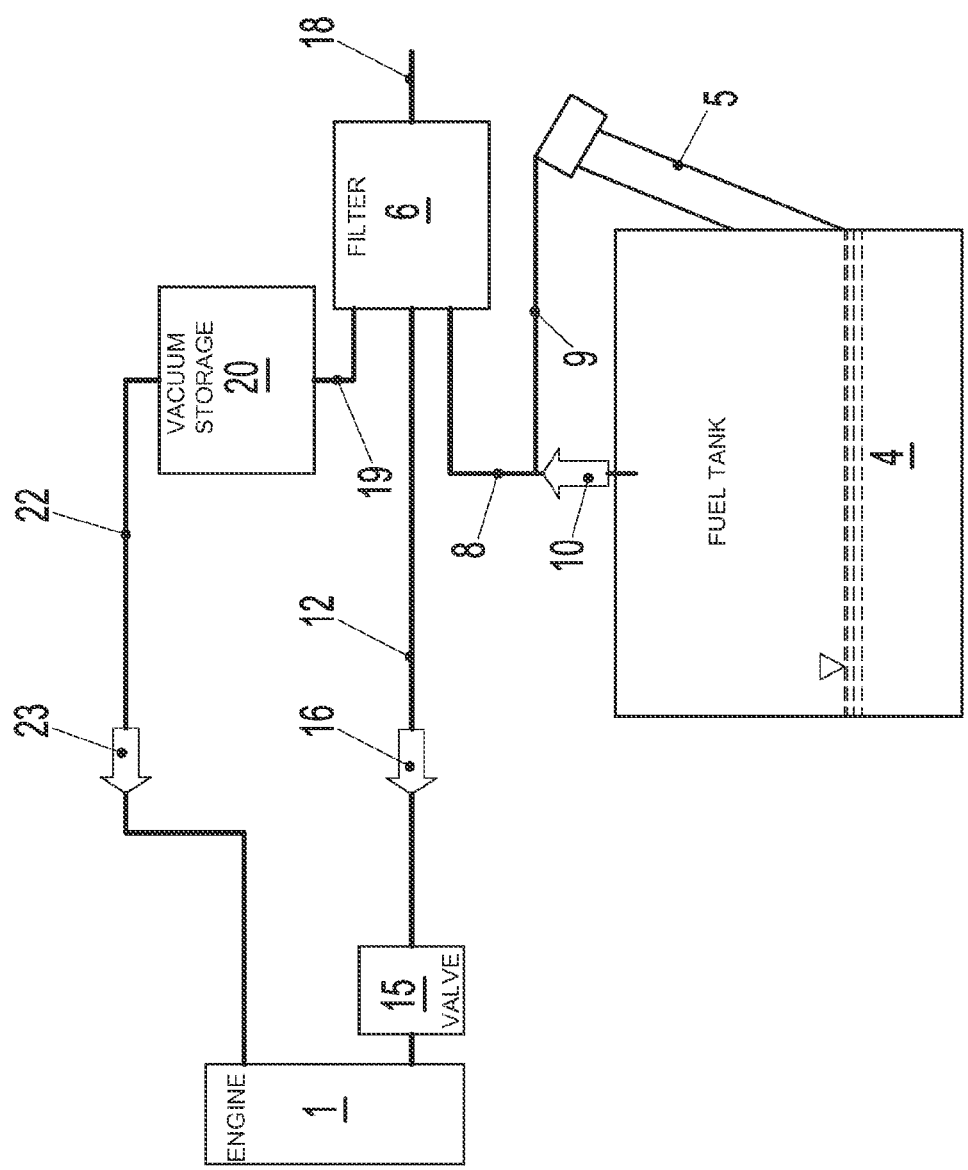
FIG. 1 is a greatly simplified representation of a motor vehicle having an internal combustion engine, a fuel tank and a tank venting system in accordance with a first embodiment.
Figure 2:
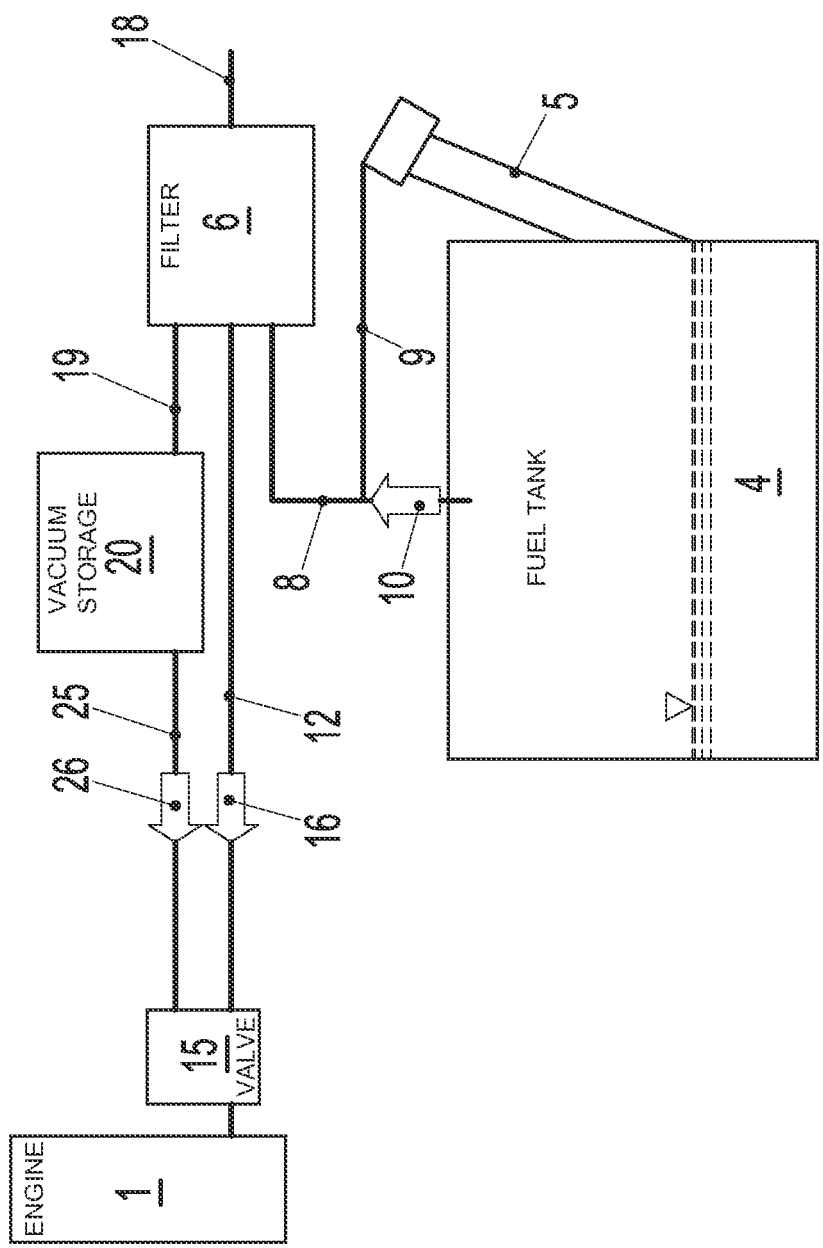
FIG. 2 is a similar representation to FIG. 1 in accordance with a second embodiment.
Figure 3:
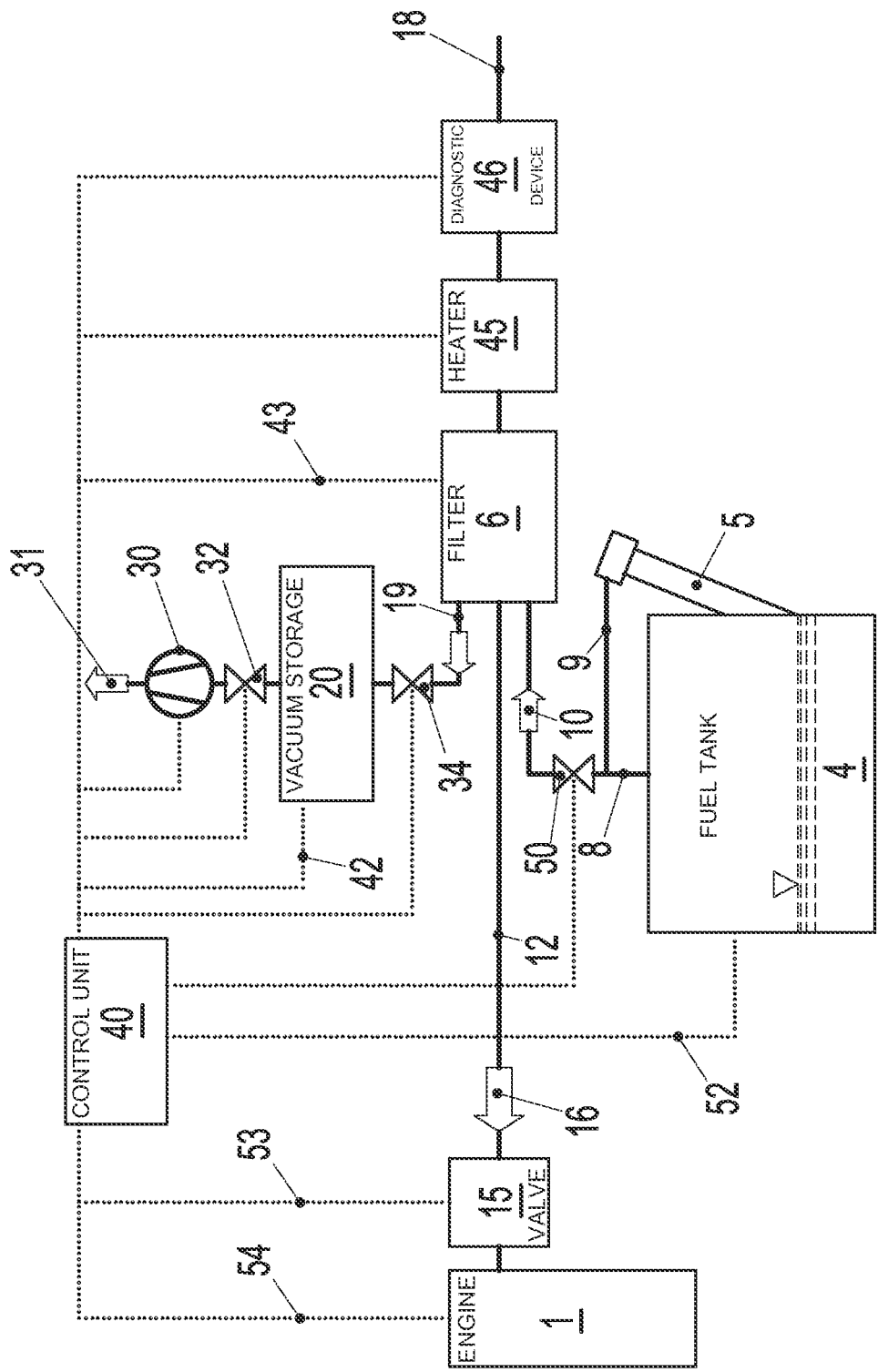
FIG. 3 is a similar representation to FIGS. 1 and 2 with a control unit and additional devices that can be controlled by the control unit.

A motor vehicle, preferably a hybrid vehicle, is shown in a greatly simplified form in FIGS. 1 to 3. The motor vehicle has an internal combustion engine 1 that is supplied with fuel from a fuel tank 4. The fuel tank 4 has a filler neck 5, via which fuel is fed into the fuel tank 4 during refueling.

A filter device 6 containing an activated carbon filter material is associated with the fuel tank 4. The activated carbon filter material absorbs fuel vapors, in particular hydrocarbons, from the fuel tank 4 to ensure that these vapors do not get into the environment.

Ambient air is passed through the activated carbon filter material to purge the filter device 6. During this process, the hydrocarbons are released and then are passed, together with the ambient air, to the internal combustion engine 1, where they are added to the combustion air in the internal combustion engine in the form of an air flow laden with hydrocarbons and are burned.

The filter device 6 is connected to the fuel tank 4 by a line 8. A line 9 branches off the line 8 and leads to the filler neck 5. An arrow 10 indicates that fuel vapors pass from the fuel tank into the filter device 6. A line 12 connects the filter device 6 to the internal combustion engine 1.

A tank venting valve 15 is arranged in the line 12. An arrow 16 indicates that fuel vapors are passed into the internal combustion engine 1 when the tank venting valve 15 is open. The filter device 6 can be connected to the environment via a line 18 to pass ambient air through the filter device 6 for purposes of purging.

A line 19 connects the filter device 6 to a vacuum storage device 20. A vacuum can be developed in the vacuum storage device 20 and is used to pass ambient air for purging through the filter device 6 and to draw it into the vacuum storage device 20 via the lines 18, 19.

The vacuum storage device 20 can be used to carry out additional purging of the filter device 6 in a simple manner when the internal combustion engine 1 is switched off. Additionally, the vacuum storage device 20 can be regenerated in manner similar to purging an activated carbon filter. More particularly, the vacuum storage device 20 is regenerated by passing ambient air through the vacuum storage device 20 for the purpose of purging. The ambient air then is fed to the internal combustion engine 1 together with the fuel vapors contained in the vacuum storage device 20 and is burned.

The vacuum storage device 20 can be subjected to a vacuum again after regeneration. More particularly, the internal combustion engine 1 can be operated as a vacuum pump for a particularly advantageous generation of the vacuum.

The vacuum storage device 20 can be connected to the internal combustion engine 1 by a line 22 in the embodiment of FIG. 1. An arrow 23 indicates that the vacuum in the vacuum storage device 20 can be generated by the internal combustion engine 1. Associated valve devices are not shown in FIGS. 1 and 2, but are described below with reference to FIG. 3.

A line 25 connects the vacuum storage device 20 to the tank venting valve 15, as shown in FIG. 2. An arrow 26 indicates that the vacuum storage device 20 can be emptied into the internal combustion engine 1 via the tank venting valve 15 when the vacuum storage device 20 is full of fuel vapors. Alternatively or additionally, the tank venting valve 15 can be used to generate a vacuum in the vacuum storage device 20 again after purging the vacuum storage device 20.

FIG. 3 illustrates various purging strategies for a plug-in hybrid vehicle. Dashed or dotted lines in FIG. 3 denote control lines. A vacuum pump 30 generates a vacuum in the vacuum storage unit 20 that draws in a mixture of fresh air laden with hydrocarbon vapor and feeds that mixture to the internal combustion engine 1, as indicated by the arrow 31.

A valve device 32 is between the vacuum pump 30 and the vacuum storage device 20. A further valve device 34 is between the vacuum storage device 20 and the filter device 6. Dotted control lines indicate that a control unit 40 controls the valve devices 32, 34 and the vacuum pump 30. Further control lines and/or signal lines 42, 43 connect the control unit 40 to the vacuum storage device 20 and the filter device 6.

A heating device 45 and/or a diagnostic device 46 are provided upstream of the filter device 6, as shown in FIG. 3, and are controlled by the control unit 40.

The heating device 45 preferably comprises at least one PTC element. PTC stands for a positive temperature coefficient. The heating device 45 is used to heat the ambient air fed in during purging.

The diagnostic device 46, for example, can diagnose a leak in the fuel tank 4. For example, the vacuum storage device 20 can apply a vacuum to the fuel tank 4. The diagnostic device 46 can be connected to pressure and/or temperature sensors that detect the pressure and/or the temperature in the vacuum storage device 20 and/or in the fuel tank 4.

The vacuum storage device 20 can be used in combination with conventional ventilated fuel systems. However, the vacuum storage device 20 can also be used in conjunction with pressurized tank systems.

A valve device 50 is inserted between the fuel tank 4 and the filter device 6. The valve device 50 connects the fuel tank 4 and filler neck 5 to the filter device 6 as required.

The valve device 50 is controlled by the control unit 40. Further signal lines 52, 53, 54 and/or control lines connect the control unit 40 to the fuel tank 4, the tank venting valve 15 and the internal combustion engine 1.

What is claimed is:

1. A motor vehicle comprising: an internal combustion engine; a fuel tank for supplying fuel to the internal combustion engine; a regeneratable filter device having a first inlet selectively communicating with the fuel tank, a second inlet selectively communicating with ambient air, a first outlet communicating with the internal combustion engine and a second outlet; a vacuum storage device having an inlet connectable to the second outlet of the filter device for receiving hydrocarbons purged from the filter device by ambient air from the second inlet of the filter device, the vacuum storage device further having an outlet communicating with an intake tract of the internal combustion engine for delivering hydrocarbons purged from the filter device to the internal combustion engine.

2. The motor vehicle of claim 1, wherein the filter device is between the vacuum storage device and a tank venting valve.

3. The motor vehicle of claim 2, wherein the vacuum storage device is connected to a side of the filter device that is associated with the internal combustion engine.

4. The motor vehicle of claim 2, wherein the vacuum storage device is selectively connectable to the internal combustion engine to purge the vacuum storage device of hydrocarbons from the filter device.

5. The motor vehicle of claim 2, further comprising a vacuum pump connected to the vacuum storage device to generate a vacuum in the vacuum storage device.

6. The motor vehicle of claim 1, the outlet of the vacuum storage device is connected to the internal combustion engine to generate a vacuum.

7. The motor vehicle of claim 1, wherein the motor vehicle is a hybrid vehicle with an electrical machine.

8. A method for operating the motor vehicle of claim 7, comprising connecting the vacuum storage device to the environment via the filter device to regenerate the filter device.

9. The method of claim 8, further comprising collecting fuel vapors in the vacuum storage device, and feeding the collected fuel vapors to the internal combustion engine.

* * * * *